United States Patent
Adolph et al.

(10) Patent No.: US 7,317,866 B1
(45) Date of Patent: Jan. 8, 2008

(54) REPRODUCING A DIGITAL DATASTREAM CONTAINING PROGRAM INFORMATION FOR TRICK MODE DISPLAY

(75) Inventors: Dirk Adolph, Ronnenberg (DE); Ralf Ostermann, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 645 days.

(21) Appl. No.: 09/640,104

(22) Filed: Aug. 15, 2000

Related U.S. Application Data

(60) Provisional application No. 60/149,296, filed on Aug. 17, 1999.

(51) Int. Cl.
*H04N 5/91* (2006.01)

(52) U.S. Cl. .......................................... 386/68; 386/95

(58) Field of Classification Search .................. 386/68, 386/52, 69, 70, 11, 55, 95
See application file for complete search history.

(56) References Cited

U.S. PATENT DOCUMENTS

| | | | | |
|---|---|---|---|---|
| 5,799,129 | A  * | 8/1998 | Muto | .......................... 386/68 |
| 6,122,433 | A  * | 9/2000 | McLaren | ...................... 386/68 |
| 6,201,927 | B1 * | 3/2001 | Comer | ......................... 386/68 |
| 6,512,882 | B1 * | 1/2003 | Teunissen | .................... 386/70 |
| 6,654,539 | B1 * | 11/2003 | Duruoz et al. | ................ 386/68 |
| 6,658,199 | B1 * | 12/2003 | Hallberg | ...................... 386/68 |

FOREIGN PATENT DOCUMENTS

| | | |
|---|---|---|
| EP | 0651391 | 5/1995 |
| EP | 0695098 | 1/1996 |
| EP | 0696798 | 2/1996 |
| EP | 0725399 | 8/1996 |
| EP | 0737975 | 10/1996 |

* cited by examiner

*Primary Examiner*—Vincent F. Boccio
(74) *Attorney, Agent, or Firm*—Joseph J. Laks; Robert B. Levy; Jorge Tony Villabon

(57) ABSTRACT

In the case of trick mode decoding e.g. single step backward, it is necessary to decode any picture in the GOP independently from its location within the GOP. The inventive method for reproducing a digital data stream containing program information for trick mode display includes the following steps of decoded the incoming digital data stream in normal playmode. Creating a group of picture history during normal decoding and storing the history in a GOP history logger. For trick mode playback the digital data stream is edited using the GOP history to achieve the correct display order. For trick mode operation the edited bitstream is decoded and the target picture is displayed.

14 Claims, 1 Drawing Sheet

$I_0$ $P_3$ $B_1$ $B_2$ $P_6$ $B_4$ $B_5$ $P_9$ $B_7$ $B_8$ $I_0$ $B_1$ $B_2$ $P_3$ $B_4$ $B_5$ $P_6$ $B_7$ $B_8$ $P_9$

REPRODUCING A DIGITAL DATASTREAM CONTAINING PROGRAM INFORMATION FOR TRICK MODE DISPLAY

CROSS REFERENCE TO RELATED APPLICATIONS

This is a non-provisional application of application 60/149,296 filed Aug. 17, 1999.

FIELD OF THE INVENTION

The invention relates to a method and apparatus for reproducing a digital data stream containing program information for trick mode display.

BACKGROUND OF THE INVENTION

For decoding an MPEG encoded video bitstream in order to navigate through the picture material the information about the encoded GOP structure is necessary. When the encoded GOP structure is known it is possible e.g. to decode and display the video sequence reverse when decoding a Digital Versatile Disc (DVD). The GOP structure is available implicitly but not explicitly in the encoded bitstream and therefor must be extracted. By providing a GOP structure analysis generated during normal decoding, however, a decoding control unit gets all information necessary to control a backward or any other free navigation for trick mode decoding.

To get the implicit GOP structure information explicitly it is known to pre-parse the video bitstream for extracting the GOP structure information and store the information in a memory. In order to get the GOP structure information explicitly a separate parsing software process is needed or dedicated parsing hardware device. The software process needs extra processing power and the hardware device needs extra chip area.

SUMMARY OF THE INVENTION

It is an object of the invention to disclose a method for obtaining the GOP structure information explicitly on the fly. It is a further object of the invention to disclose an apparatus which utilizes the inventive method.

MPEG bitstreams are encoded in GOP structures containing I, P and/or B frame types. The number of frames may vary depending on e.g. the picture content or compression standard. To reconstruct the video picture sequence in display order it is necessary to reorder the different frame types according to the GOP structure. The information of the GOP structure is not explicitly defined but is discovered and used during the normal decoding process. However, for free navigation in the picture display order to decode any picture out of the GOP, it is necessary to know the GOP structure in advance i.e. explicitly.

An MPEG bitstream is built upon a GOP structure containing one independently encoded I-frame and several P and B frames dependently encoded from this I frame. This is done to have best results in data compression. The GOP structure is chosen free by the encoder and may even vary within every new GOP in the bitstream. The GOP structure is detected by parsing each single picture header during the decoding process. For display the de-coded pictures are re-arranged according to the GOP structure.

In the case of trick mode decoding e.g. single step backward it becomes necessary to decode any picture in the GOP independently of its location within the GOP. To do this for any possible picture in the GOP, the decoding process must decode all pictures starting from the beginning of the GOP until it reaches the destination picture to be displayed. This requires knowledge of the GOP structure in advance.

The inventive method for reproducing a digital data stream containing program information for trick mode display includes the following steps:

firstly the incoming digital data stream is decoded in normal play mode, secondly a group of picture history is created during said normal decoding, thirdly said history is stored in a GOP history logger memory, fourthly for playback in trick mode said digital data stream is edited by using said history in order to extract and prepare required parts of the bitstream, fifthly said edited bitstream is decoded for trick mode, sixthly a target picture or a sequence of target pictures is displayed.

Editing allows the original bitstream to be changed in such a way that for the trick mode decoding the required parts are extracted and prepared for the standard decoding hardware. Advantageously the GOP structure is created during normal playback mode hence pre-parsing software or a special pre-parsing hardware is avoided.

Furthermore during the editing and decoding steps of the bitstream for trick mode operation the last decoded picture is maintained displayed to achieve undisturbed picture display for the user.

In the decoder two frame buffers are used for decoding the edited bitstream for trick mode operation so that the decoding is performed invisibly. In order to avoid extra buffers during trick mode operation the decoding of B-frames of the edited bitstream is performed without storing the reconstructed picture.

Preferably playback in trick mode is controlled by a trick mode controller whereby the trick mode controlled functions the following way:

the trick mode controller receives a command from a mode request unit, the trick mode controller requests, based on the mode request, the content of the group of picture history memory, the trick mode controller controls a pick-up device for data stream selection, the trick mode controller enables the bitstream editing for trick mode application, the trick mode controller controls the decoding, the trick mode controller initiates a display switch for displaying the target picture.

In an alternative arrangement trick mode control functions as follows. The trick mode controller receives a command from a mode request unit, and based on the mode request the trick mode controller requests the content of the group of picture history from the memory. The trick mode controller controls a pick-up device for data stream selection, and enables bitstream editing for trick mode application. In addition the trick mode controller controls picture decoding and adds a time stamp to the bit stream to provide display switching information.

An inventive apparatus, which utilizes the inventive method for reproducing a digital data stream containing program information for trick mode display includes the following parts. A decoder for decoding the incoming digital data stream in a normal play mode. An extraction means creates a group of picture (GOP) history during normal play mode decoding of the incoming digital data stream and the history is stored in a GOP history logger memory. For in trick mode operation an editor facilitates editing of the digital data stream by using the stored history. The bitstream edited for trick mode operation, is decoded by a decoder having an output for picture display. Advantageously an enabling means facilitates the display of the last decoded picture during decoding of the edited bitstream for trick mode.

For decoding the edited bitstream for trick mode two frame buffers store the decoded bitstreams, and to avoid additional buffers, B-frame decoding of the edited bitstream is performed without storing the decoded result.

The inventive apparatus preferably contains a trick mode controller, which controls the playback in trick mode, wherein:

the trick mode controller is connected to a mode request unit (not shown), the trick mode controller is connected to the GOP history logger which stores the GOP history for requesting based on the mode request the content of the group of picture history, the trick mode controller is connected to a pick-up device (not shown) for controlling the data stream selection, the trick mode controller is connected to the editor for enable bitstream editing for trick mode application, the trick mode controller is connected to the decoder for controlling the decoding, the trick mode controller is connected to the output for initiating the display switch for displaying the target picture.

Alternatively the trick mode controller contains the following features:

the trick mode controller is connected to the GOP history logger for storing the history for requesting based on the mode request the content of the group of picture history, the trick mode controller is connected to a pick-up device (not shown) for controlling the data stream selection, the trick mode controller is connected to the editor for enable the bitstream editing for trick mode application, the trick mode controller is connected to the decoder for controlling the decoding, the trick mode controller adds a time stamp to the bit stream to provide display switching information.

The invention can be used for any compressed video encoded content stored on a medium, e.g. for MPEG 1, 2 and 4 video decoding or Video-CD. The invention can be implemented in either hardware or software.

BRIEF DESCRIPTION OF THE DRAWINGS

Embodiments of the invention are described with reference to the accompanying drawings.

DETAILED DESCRIPTION

Figure 1A:
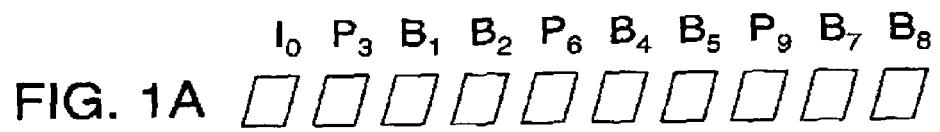
FIGS. 1A and 1B. Illustrate MPEG picture sequences in decoding and presentation order.
Figure 1B:
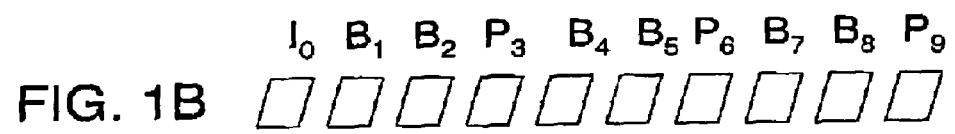

FIG. 1 shows a decoding order versus presentation order. In FIG. 1A the decoding order the pictures are arranged as follows, I0, P3, B1, B2, P6, B4, B5, P9, B7, B8 order. FIG. 1B shows the display order of the decoded pictures, I0, B1, B2, P3, B4, B5, P6, B7, B8, P9. In this example a GOP structure contains 10 pictures. As described before this GOP structure may vary depending on the application or picture content.

Figure 2:
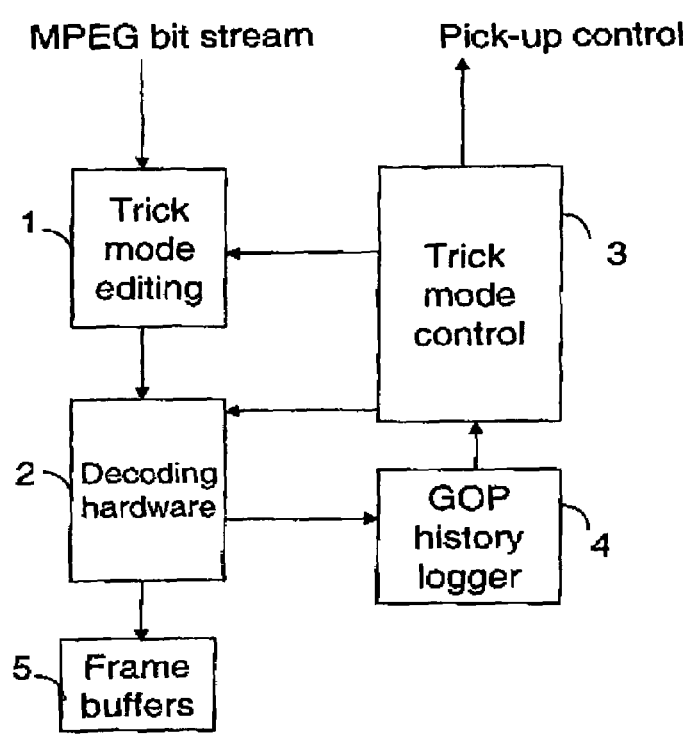
FIG. 2. Is a functional block diagram depicting trick mode control and generation of GOP history.

FIG. 2 shows a functional block diagram of GOP history generation within a playback device. An MPEG bit stream is fed to a trick mode editing device 1. The output of the trick mode editing device 1 is connected to a decoding hardware 2, having an output which is connected to a picture display device. The trick mode editing device 1 is controlled by a trick mode controller 3. In normal play-mode the editing device 1 is disabled and enabled in the trick mode by the trick mode controller. The trick mode controller 3 is also connected to the decoding hardware 2 and a pick-up control unit of the playback device. The decoding hardware 2 is connected to a GOP history logger 4, which is connected via an output to the trick mode controller 3.

The function of the block diagram is described by an example, whereby a single step backward mode is taken. The 5th picture B4 in the GOP of FIG. 1 is frozen in a display. Stepping backward one picture must show the 4th picture P3 of the GOP. Picture P3 is reconstructed by decoding the GOP starting from the beginning, while keeping the 5th picture B4 in the display. The decoder 2 is decoding the two pictures I0 and P3 invisibly in the background. After finishing the decoding of P3, the display is switched to the target picture P3.

A further single step backward will show the 3rd picture B2 of the GOP. This is done by decoding the GOP again starting form the beginning, while holding the 4th picture P3 in the display. The decoder is decoding four pictures I0-P3-B1 and B2 invisible in the background. B1 is decoded into a NULL device because it is a B-frame which is not required for this trick mode run. A NULL device is a memory address having no memory applied. The decoding of not depicted B-frames into a NULL device is done to manage trick modes without any requirement for extra other than the usual three frame buffers. The next B-frame, picture B2, is decoded into a frame buffer again and after finishing the decoding of B2, the display is switched to it.

Three frame buffers are used, where one is used to provide a picture for display during trick mode decoding and the other two frame buffers 5 (refer to FIG. 2) are used for trick mode decoding itself.

As explained before it is necessary to generate the GOP structure in advance to do such trick modes. The inventive solution shown here is a GOP structure preanalysis using the existing decoder hardware. By using this solution no costly preanalysis hardware or software is required.

As shown in FIG. 2 the GOP history is generated by running the decoder through the GOP and logging the type of picture. During this invisible decoder run, the display is not update. The logged GOP history information can be used later on to control the trick mode editing and decoding by the trick mode control unit.

Advantages of the inventive solution areas follows.

1) Generation of a GOP history during normal decoding process thereby avoiding any extra hardware.

2) Decoding the bitstream in the background invisible for the displayed picture.

3) Decoding B-frames not used for display into a NULL device, i.e. the re-construction is written into an address area having no memory plugged in. The NULL device is used to manage invisible decoding with no extra frame buffer.

4) Using the invisible bitstream decoding for trick modes: single step forward, single step backward, slow motion backward and fast motion backward.

What is claimed is:

1. A method for reproducing a digital data stream containing program information for trick mode display, said method including the steps:

a) decoding the incoming digital data stream in normal playmode,
b) creating a group of picture structure history having more than one group of pictures during said decoding step,
c) storing said history,
d) editing for playback in trick mode said digital data stream using said history,
e) decoding said digital data stream edited for trick mode display.

2. The method of claim 1, wherein said step a) includes the step of:
f) maintaining and displaying a last decoded picture during said step e).

3. The method of claim 2, wherein said step e) includes the step of:
g) decoding invisibly using two frame buffers.

4. The method of claim 1, wherein said step of decoding said edited bit stream includes the step of:
h) decoding a B-frame without storing its content in a frame buffer.

5. The method of claim 1, comprising a further step of:
i) controlling trick mode playback responsive to a trick mode controller.

6. The method of claim 5, wherein said step i) comprises the following steps:
receiving a trick mode command,
acquiring said history responsive to said trick mode command,
controlling data stream selection,
enabling said bit stream editing for trick mode playback,
decoding said digital data stream edited for trick mode playback,
displaying a picture or a sequence of pictures decoded for trick mode playback.

7. The method of claim 5, wherein said step i) comprises the following steps:
receiving a command from a mode request unit,
acquiring said history based on said mode command,
controlling data stream selection,
editing said bit stream for trick mode application,
controlling said decoding of said bitstream,
adding a time stamp to said bit stream to provide display switching information.

8. A digital device for reproducing a digital data stream containing program information for trick mode display, comprising:
a decoder for decoding the incoming digital data stream in normal playmode,
extraction means for creating a group of picture structure history having more than one group of pictures during normal decoding,
a memory coupled to said extraction means for storing said history,
an editor coupled to said memory for editing said digital data stream using said history for playback in trick mode,
a decoder for decoding said edited bit stream for trick mode, and
an output for providing that decoded target picture or a sequence of target pictures for displaying.

9. The device of claim 8, further comprising:
an enabling means for controlling the display of the last decoded picture during decoding of said edited bit stream for trick mode.

10. The device of claim 9, further comprising:
two frame buffers for storing the decoded bit streams.

11. The device of claim 10, wherein:
said decoding of said edited bit stream for trick mode is performed on a B-frame without storing its content in a frame buffer.

12. The device of claim 8, further comprising:
a trick mode controller for controlling said playback in trick mode.

13. The device of claim 12, further comprising:
a mode request unit coupled to said trick mode controller, and responsive to said mode request unit said trick mode controller accesses said history from said memory,
a pick-up device controllably coupled to said trick mode controller for controlling data stream selection,
wherein in trick mode application said trick mode controller is controllably coupled to said editor to enable said bitstream editing, and said trick mode controller is controllably coupled to said decoder for controlling said decoding, and said trick mode controller is controllably coupled to said output for initiating said display switch to display said target picture or a sequence of target pictures.

14. The device of claim 12, further comprising:
a mode request unit coupled to said trick mode controller, and responsive to said mode request unit said trick mode controller accesses said history from said memory,
a pick-up device controllably coupled to said trick mode controller for controlling data stream selection,
wherein in trick mode application said trick mode controller enables said editor for editing said bit stream, and said trick mode controller being controllably coupled to said decoder for controlling decoding, and wherein said trick mode controller adds a time stamp to said bit stream to provide display switching information.

* * * * *